(12) United States Patent
Gross (10) Patent No.: US 8,479,939 B1
(45) Date of Patent: Jul. 9, 2013

(54) TRANSPORTABLE STORAGE DEVICE

(76) Inventor: James Gross, Lake Odessa, MI (US)

( * ) Notice: Subject to any disclaimer, the term of this patent is extended or adjusted under 35 U.S.C. 154(b) by 27 days.

(21) Appl. No.: 13/411,581

(22) Filed: Mar. 4, 2012

(51) Int. Cl.
*A01K 97/04* (2006.01)
*B65D 85/00* (2006.01)
*A47G 19/00* (2006.01)

(52) U.S. Cl.
USPC ........... 220/23.8; 220/23.86; 220/676; 220/6; 206/315.11; 43/55

(58) Field of Classification Search
USPC ............. 220/737, 625, 676, 661, 4.07, 6, 220/23.2, 23.83, 23.86, 503, 505, 4.01, 4.03, 220/23.8; 206/545, 541, 372, 315.11, 6.1, 206/315.6, 315.5, 373; 43/55, 56, 54.1
See application file for complete search history.

(56) References Cited

U.S. PATENT DOCUMENTS

| | | | | |
|---|---|---|---|---|
| 304,805 | A * | 9/1884 | Coutteil | 220/592.28 |
| 3,713,529 | A * | 1/1973 | Meksula | 312/272 |
| 4,353,182 | A * | 10/1982 | Junkas et al. | 43/54.1 |
| 5,305,542 | A * | 4/1994 | Phelps | 43/21.2 |
| 5,386,907 | A * | 2/1995 | Kahl et al. | 206/315.11 |
| 5,411,163 | A * | 5/1995 | Gueret | 220/326 |
| 5,755,057 | A * | 5/1998 | Dancer | 43/54.1 |
| 6,637,590 | B1 * | 10/2003 | Matsuki | 206/315.5 |

* cited by examiner

*Primary Examiner* — Anthony Stashick
*Assistant Examiner* — Kevin Castillo
(74) *Attorney, Agent, or Firm* — Gulf Coast Intellectual Property Group (57) ABSTRACT

A transportable storage device having three compartments wherein a main compartment is configured to maintain a temperature dissimilar to that of its environment. The transportable storage device includes two opposedly mounted storage compartments that are hingedly attached so as to have a first position and a second position. The two opposedly mounted storage compartments are secured utilizing a pair of support arms. A first container is disposed within the main compartment and is superposed a plurality of support brackets. An access hatch is further included being mounted within the main compartment and operable to cover a second opening in the wall of the main compartment. A second container is included and is rotatably mounted within one of the two opposedly mounted storage compartments. A sliding transport member is further included and is configured to slidably traverse the storage device across a terrain.

6 Claims, 5 Drawing Sheets

TRANSPORTABLE STORAGE DEVICE

FIELD OF THE INVENTION

The present invention relates to a transportable storage device, more specifically but not by way of limitation, a transportable storage device having multiple compartments operably connected wherein at least one compartment has a portion that is thermally isolated and the additional compartments are configurable to store a plurality of items. The transportable storage device further includes a first means and a second means of being transported.

BACKGROUND

Millions of individuals regularly participate in outdoor activities. Outdoor activities such as but not limited to hiking, fishing and hunting are extremely popular in most parts of the United States. Two of the most popular outdoor sports are hunting and ice fishing. Participants of the aforementioned sports typically transport a plurality of specialized items designed to facilitate the tasks required in either ice fishing or hunting. Those individuals that engage in ice fishing will typically transport containers and/or accessories having a specific purpose. For example, a typical ice fisherman may transport an ice chest to store their catch, a tackle box, at least one fishing rod and a stool or chair to sit on while they are fishing.

One issue with the utilization of many items/accessories for ice fishing is the logistic challenge of transporting all of these items/accessories. Transportation of multiple items/accessories such as ice chest, stool, storage compartment and fishing rods has proven to be challenging for participants of ice fishing. As these items/accessories are typically manufactured as separate components, there is currently no method of transportation that allows a participant to easily transport all of the aforementioned items/accessories.

Another issue with current items/accessories is that their provided functionality is singular. Conventional ice chests do not offer additional functionality for storage of items such as fishing tackle. Further, current tackle box technology does not provide any additional functionality for storing or transporting items other than conventional fishing tackle.

Accordingly, there is a need for a transportable storage device that includes a plurality of compartments that is equipped to provide storage for items such as but not limited to fishing tackle, hunting equipment and the like while further including at least one thermally isolated compartment. Furthermore, the transportable storage device should be configured with at least two means of facilitating an improved transportation thereof.

SUMMARY OF THE INVENTION

It is the object of the present invention to provide a transportable storage device that includes at least three storage compartments wherein one storage compartment includes a portion that is thermally isolated.

Another object of the present invention is to provide a transportable storage device that includes auxiliary storage compartments that are hingedly coupled to a main storage compartment.

Yet another object of the present invention is to provide a transportable storage compartment that includes an access hatch providing access to the thermally isolated portion.

Still a further object of the present invention is to provide a transportable storage compartment that includes configurable internal storage within the auxiliary storage compartments.

An additional object of the present invention is to provide a transportable storage compartment wherein the auxiliary storage compartments have a first position and a second position, wherein in the first position the auxiliary compartments are positioned for transportation of the transportable storage compartment.

Another object of the present invention is to provide a transportable storage device that includes a sled having a mateable recessed mold operable to receive the main compartment of the storage device wherein the sled is operable to assist in the transportation of the storage device.

Still a further object of the present invention is to provide transportable storage compartment that further includes fasteners and/or mechanisms to secure accessories such as fishing rods thereto.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a transportable storage device 100 constructed according to the principles of the present invention.

The transportable storage device 100 includes a first compartment 10 that is generally cylindrical in shape having an interior volume 12 operable to receive and store objects therein. The first compartment 10 is manufactured from a wall 14 and bottom 16 that are integrally formed. The wall 14 and bottom 16 are manufactured from a suitable durable material such as but not limited to plastic. The wall 14 and bottom 16 include an insulative layer 18 operable to sustain the temperature of the interior volume 12 at a temperature that is dissimilar to its environment. It is contemplated within the scope of the present invention that the insulative layer 18 could be manufactured from numerous suitable materials such as but not limited to foam. Proximate the upper edge 20 of the wall 14 are threads 22. The threads 22 are conventional threads that are operable to mateably couple with threads on the top 24. The top 24 is releasably secured to the first compartment 10 so as to allow access to the interior volume 12 via opening 26. The top 24 is generally annular in shape and is operable to substantially cover the opening 26. The top 24 is formed in a shape that is mateably coupled with the first compartment 10. Releasably secured to the top 24 is a cushion 23. The cushion 23 is a conventional padded cushion that is similar in shape to the top 24 so as to provide substantial covering thereof. The cushion 23 is releasably secured to the top 24 utilizing suitable fasteners such as but not limited to snaps or hook and loop fasteners. While not illustrated herein, it is contemplated within the scope of the present invention that the cushion 23 further includes an accessible compartment to insert an item such as but not limited to a heating pad. Those skilled in the art will recognize that the accessible compartment cold be created by utilizing a zipper or similar fastener to provide access into the accessible compartment. While the preferred embodiment discussed and illustrated herein utilizes a first compartment 10 that is generally cylindrical in shape, it is contemplated within the scope of the present invention that the first compartment 10 could be formed in numerous different shapes and still achieve the desired functionality as described herein.

Disposed within the first compartment 10 is a first container 28. The first container 28 is slightly smaller in diameter than the first compartment 10 so as to allow the first container 28 to be disposed within a portion of the interior volume 12 of the first compartment 10. The first container 28 is annular in shape and consists of a wall 30 and bottom 32 that are integrally formed to create an interior volume 34. The first container 28 is disposed within the interior volume 12 of the first compartment 10 proximate the first end 9. While not illustrated herein, it is contemplated within the scope of the present invention that the first container 28 could further include a handle so as to provide an interface to remove the first container 28 from the first compartment 10. The first container 28 is positioned within the interior volume 12 utilizing supports 36. As shown in particular in FIG. 5, the supports 36 are secured to the interior surface 13 of the wall 14. The supports 36 are generally right angle in shape and are mounted along the interior surface 13 generally equidistant around the circumference of the first compartment 10. The supports 36 include a first portion 37 and a second portion 38 and are mounted such that the second portion 38 extends outward into the interior volume 12 of the first compartment 10. The mounting of the supports 36 in the above described manner provides improved support for the first container 28. While four supports 36 are preferred in the present invention, it is contemplated within the scope of the present invention that more or less than four supports 36 could be utilized. Furthermore, while the supports 36 have been illustrated herein as having a first portion 37 and second portion 38 that are generally perpendicular to each other, it is contemplated within the scope of the present invention that the supports 36 could be formed in numerous different shapes and achieve the functionality as described herein.

Figure 5:
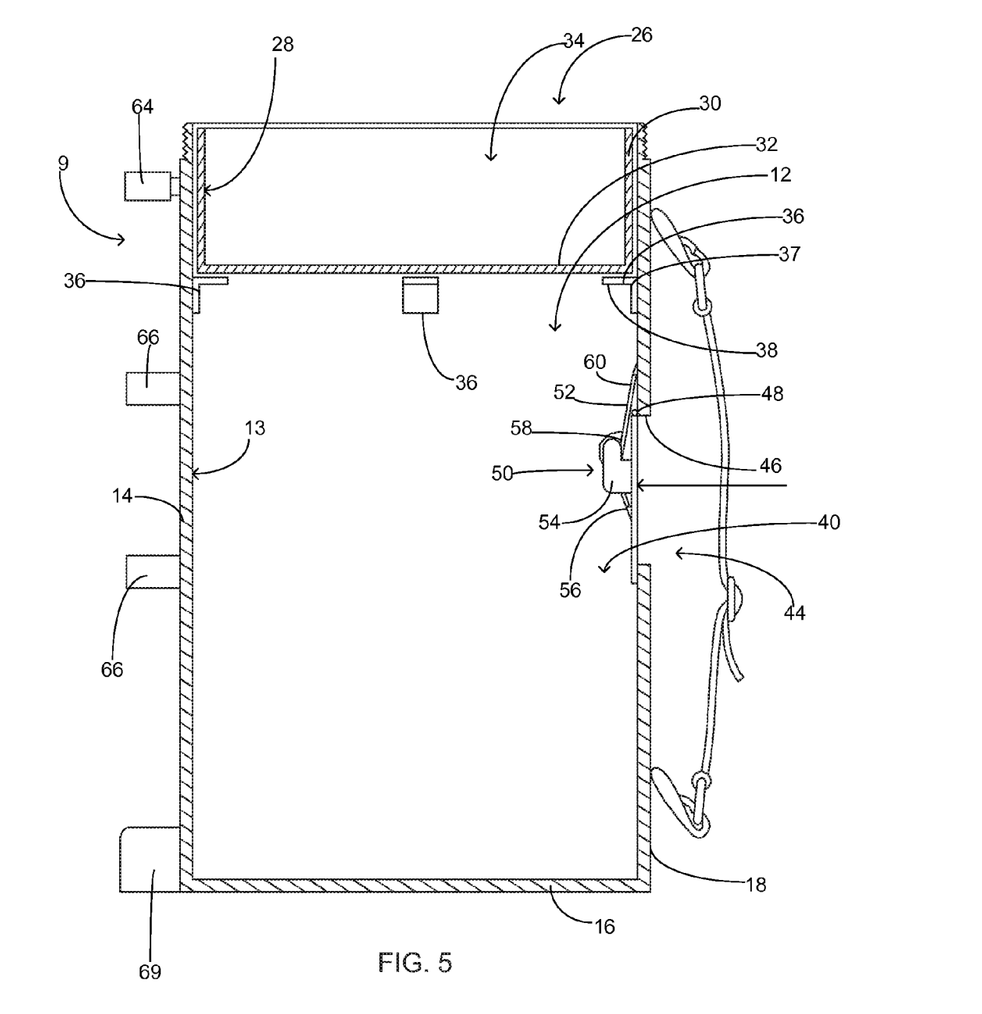
FIG. 5 is a cross-sectional view of the first compartment of the present invention.
Figure 6:
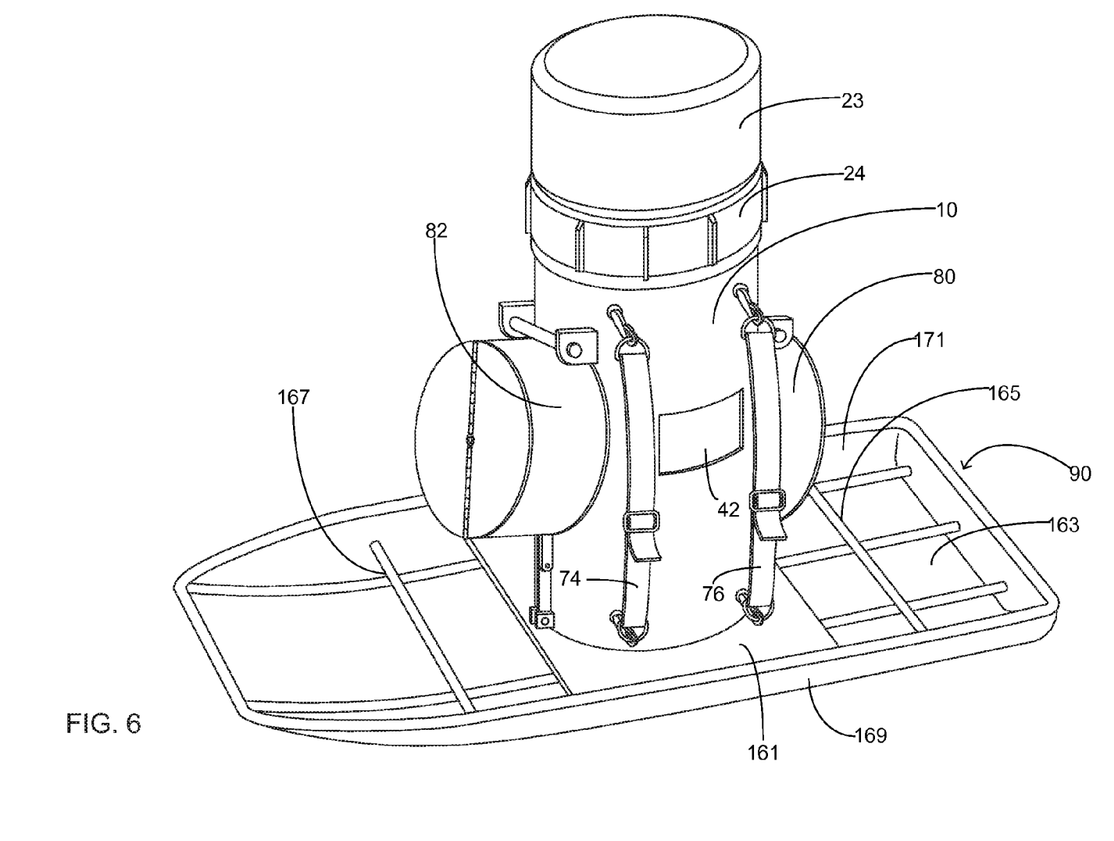
FIG. 6 is a perspective view of the present invention.

Beneath the first container 28 is a storage area 40. The storage area 40 is provided to accommodate larger objects therein. The storage area 40 is accessible via removal of the first container 28 or via the access hatch 42. The access hatch 42 provides access to the storage area without the need to remove the top 24 or first container 28. This proves significantly effective when a user is superposed the cushion 23 and needs to deposit an object such as but not limited to a fish in the storage area 40. The access hatch 42 is generally rectangular in shape and is mounted so as to substantially cover the second opening 44 of the first compartment 10. The second opening 44 is journaled through the wall 14 wherein the top edge 46 of the second opening 44 is beneath the supports 36. The access hatch 42 is hingedly mounted to the interior surface 13 of the wall with hinge 48. The access hatch 42 is biased against the second opening 44 with spring assemblies 50. The spring assemblies 50 function to bias the access hatch 42 against the second opening 44 so as to reduce temperature loss of the storage area 40 and maintain any objects disposed therein. The spring assemblies 50 include a first portion 52, mount 54 and second portion 56. The first portion 52 is manufactured from a resilient metal and includes a first end 58 and second end 60. The first end 58 is secured to mount 54 and the second end 60 is secured to the interior surface 13 of the wall 14 utilizing suitable durable techniques. The second portion 56 extends from the mount 54 to the access hatch 42. As a user applies an inward pressure to the access hatch 42, the access hatch 42 is transitioned from its first biased position to a second position wherein a portion of the access hatch 42 is angularly positioned with respect to the second opening 44 so as to allow a user to deposit an object within the storage area 40. While the spring assemblies 50 are discussed herein as a preferred technique to bias the access hatch 42, it is contemplated within the scope of the present invention that the access hatch 42 could be biased with numerous types of fasteners.

Disposed on the exterior surface 15 of the wall 14 are a plurality of clips 62. A pair of upper clips 64 and a pair of lower clips 66 are mounted to the wall 14 utilizing suitable durable fasteners. The upper clips 64 and lower clips 66 are manufactured from a suitable resilient material such as but not limited to plastic or metal. The upper clips 64 are configured so as to be able to be releasably secured to a portion of a conventional fishing rod. Integrally formed with the first compartment 10 proximate the bottom 16 are a first rod butt holder 68 and a second rod butt holder 70. The first rod butt holder 68 and second rod butt holder 70 are mounted on the wall 14 such that they are in general axial alignment with the upper clips 64. The first rod butt holder 68 and second rod butt holder 70 include depressions 72 that are suitable in size to accommodate a portion of a conventional fishing rod butt therein. The upper clips 64 function to engage a portion of the conventional fishing rod so as to releasably secure a conventional fishing rod to the wall 14. While the transportable storage device 100 is illustrated herein as having the upper clips 64, first rod butt holder 68 and second rod butt holder 70 configured to releasably secure two conventional fishing rods, it is contemplated within the scope of the present invention that the transportable storage device 100 could be configured to have releasably secured thereto more or less than two conventional fishing rods. The lower clips 66 are positioned on the wall 14 intermediate the upper clips 64 and the rod butt holders 69. The lower clips 66 include an arcuate member 72 that is operable to receive and retain a plurality of objects. While the lower clips 66 are configurable to releasably secure a plurality of objects, it is contemplated within the scope of the present invention that the arcuate member 72 of the lower clips 66 is configured to releasably secure an arrow quiver therein.

As shown in FIG. 2, the first compartment 10 further includes carrying straps 74,76. The carrying straps 74,76 are generally planar in manner and elongated in shape. The carrying straps 74,76 function to provide a user an interface to carrying the transportable storage device 100 when the sliding transport member 90 is not being utilized. The carrying straps 74,76 are secured to the wall 14 utilizing fasteners 78. The fasteners 78 are conventional d-ring type fasteners that function to releasably secure the carrying straps 74,76 to the wall 14. Those skilled in the art will recognize that numerous configurations and amounts of the carrying straps 74,76 are possible.

Figure 2C:
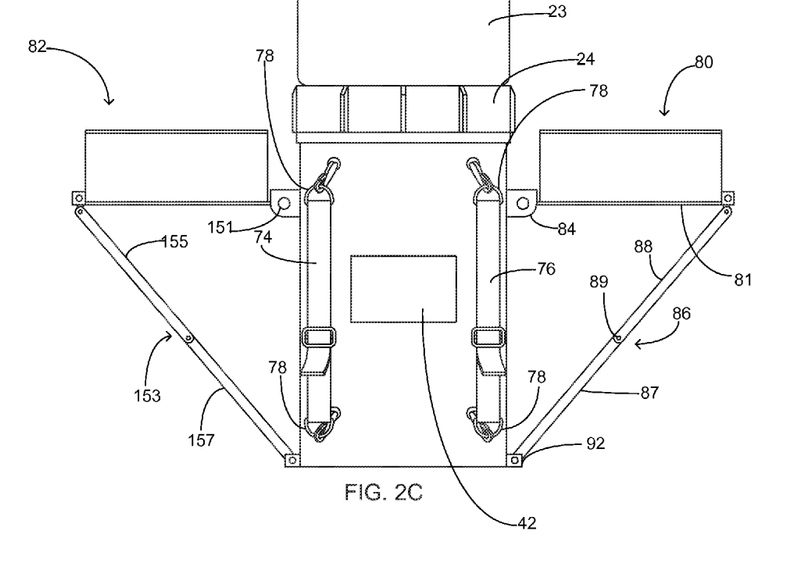
FIG. 2C is a side view of the present invention with the second compartment and third compartment deployed.
Figure 3:
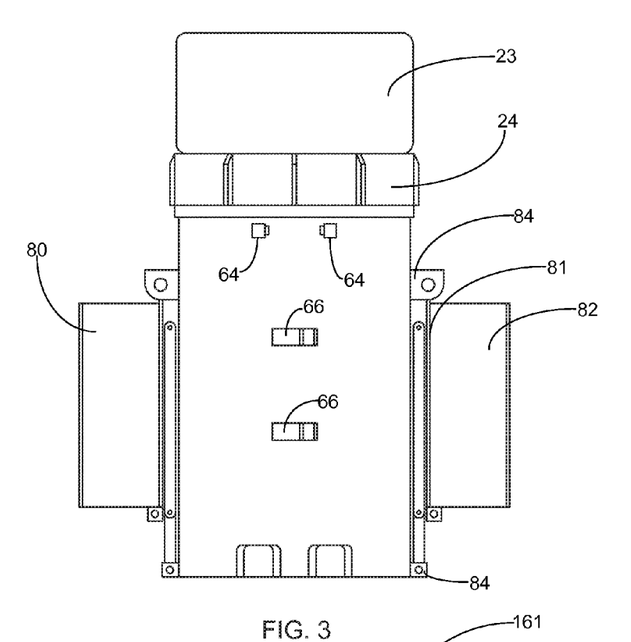
FIG. 3 is a side view of the present invention with the second and third compartment in their folded position.

The transportable storage device 100 further includes a second compartment 80 and a third compartment 82. The second compartment 80 and third compartment 82 are hingedly secured to the wall 14 and diametrically opposed so as to be mounted on opposing sides of the first compartment 10. The second compartment 80 is generally annular in shape and is hingely mounted to the first compartment 10 with fastener 84. Fastener 84 is a conventional fastener that allows the second compartment 80 to be placed in either a first position or a second position relative to the first compartment 10. FIG. 3 illustrates the first position of the second compartment 80 wherein the second compartment 80 is hinged such that the bottom 81 is generally parallel and adjacent the wall 14. FIG. 2C illustrates the second position of the second compartment 80. In the second position the second compartment 80 is hinged outward from the first compartment 10 such that the bottom 81 is generally perpendicular to the wall 14. A support arm 86 functions to support the second compartment 80 and control the transition between the first position and the second position. The support arm 86 includes a first portion 87 and a second portion 88. The first portion 87 and second portion 88 are pivotally mounted via pin 89. The support arm 86 extends outward as the second compartment 80 is transitioned to its second position. The support arm 86 is configured such that the first portion 87 and second portion 88 pivot to the point where the first portion 87 and second portion 88 are generally aligned in a linear manner but can not extend beyond so as to provide stable support for the second compartment 80. The support arm 86 is secured to the first compartment 80 via fastener 92. Fasteners 92 and 84 are conventional hinge type fasteners that are permit the hingable movement of the second compartment 80. While one support arm 86 is illustrated herein as being configured to support the second compartment 80, it is further contemplated within the scope of the present invention that more than one support arm 86 could be utilized to movable connect the second compartment 80 to the first compartment 10.

The second compartment 80 is manufactured from a suitable durable material such as but not limited to plastic. The second compartment 80 includes an interior 94 that is divided into sections 96. The sections 96 include an annular shape section 98 that is centrally located within the interior 94. A plurality of walls 99 further divide the interior 94 into approximately four equal compartments 101. The four equal compartments 101 are operable to store a variety of objects therein. The annular shaped container 98 is suitable for holding items such as beverage cans or specialized tackle containers, while the four equal compartments 101 are operable to receive and store a plurality of loose or packaged items. While it is contemplated within the scope of the present invention that the second compartment 80 is divided into plurality of sections 96, it is contemplated within the scope of the present invention that the second compartment 80 could have any number of compartments configured to receive and store objects therein. It is further contemplated within the scope of the present invention that the annular shaped container 98 is separably removable or permanently mounted within the second compartment 80. The second compartment 80 further includes a top 103. The top 103 is generally annular in shape and manufactured from a suitable durable material such as but not limited to plastic. The top 103 is operable to cover the interior 94 of the second compartment 80. The top 103 includes a first portion 105 and a second portion 107. The top 103 further includes a hinge 109 centrally located that is the length of the diameter of the top 103. The hinge 109 allows a user to lift either the first portion 105 or second portion 107 to access the interior 94 of the second compartment 80. While a bi-fold top 103 has been disclosed herein, it is contemplated within the scope of the present invention that the top 103 could be configured in numerous different manners.

Figure 1:
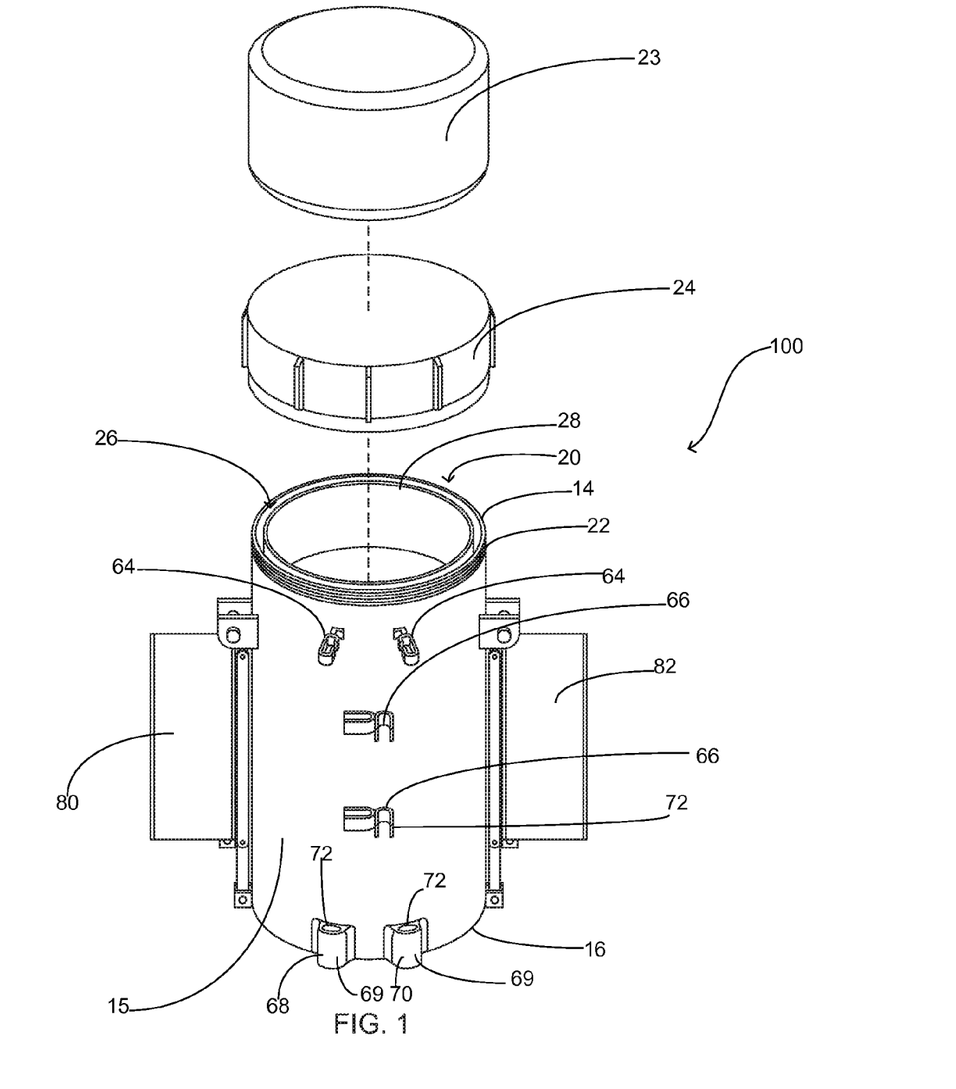
FIG. 1 is a perspective view of the present invention with center compartment shown in an exploded manner.
Figure 2A:
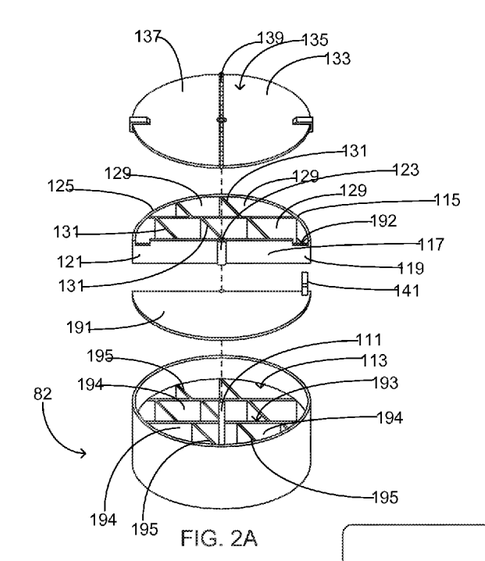
FIG. 2A is a detailed view of the interior components of the third compartment of the present invention.
Figure 2B:
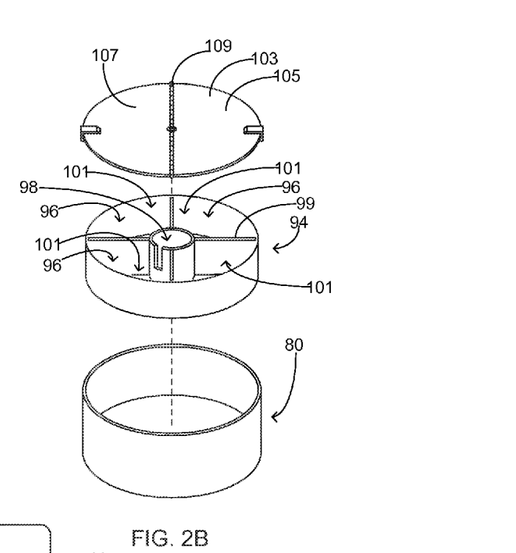
FIG. 2B is a detailed view of the interior components of the second compartment of the present invention.

Referring in particular to FIG. 2A, the third compartment 82 is shown in detail. The third compartment 82 includes a centrally mounted rod 111 oriented in a generally vertical manner. The rod 111 is manufactured from a suitable durable material such as but not limited to plastic or metal. The rod 111 is secured within the interior volume 113 of the third compartment 82 utilizing suitable durable techniques. Rotatably mounted to the rod 111 is a divided container 115. The divided container 115 is generally semi-annular in shape having a first wall 117 with a first end 119 and second end 121. Intermediate the first end 119 and second end 121 is the rod receptacle 123. The rod receptacle 123 is generally cylindrical in shape and hollow so as to receive the rod 111 therein. The divided container 115 further includes a second wall 125 that is generally arcuate in shape. The divided container 115 has an interior 127 that is divided into a plurality of portions 129 utilizing configurable walls 131. The configurable walls 131 are releasably secured to each other via suitable techniques and function to create the plurality of portions 129 of different sizes as desired by the user. It is contemplated within the scope of the present invention that the configurable walls 131 could be utilized to create as few as two portions 129 or a plurality thereof depending upon the items that a user desired to store within the third compartment 82. A locking mechanism 141 is movably secured to the lower cover 191. The locking mechanism 141 is operable to engage the notch 192 proximate the first end 119 so as to inhibit the divided container 115 from rotating during transportation. The locking mechanism 141 is movably coupled to the lower cover 191 utilizing suitable conventional fasteners. The locking mechanism 141 engages the notch 192 so as to allow the top 133 to close without interference from the locking mechanism 141. The locking mechanism 141 is a modified t-shape but it is contemplated within the scope of the present invention that the locking mechanism 141 could be formed in numerous different shapes and accomplish the desired objective herein. A top 133 is configured having a first portion 135 and a second portion 137 with a hinge 139 dissecting the top 133 such that the first portion 135 and second portion 137 are generally equal in size. The bi-fold design of the top 133 provides improved access to the divided compartment 115 of the third compartment 82. Disposed within the second compartment 82 is a lower divided container 193. The lower divided container 193 includes a plurality of walls 195 that are operable to create a multitude of portions 194. As previously discussed herein, it is contemplated within the scope of the present invention that the walls 195 could be removably configurable in order to create a varying range of sizes of portions 194. The divided container 115 is superimposed the lower divided container 193. The lower cover 191 is rotatably mounted to rod 111 and function to cover the portions 194 that are not underneath the divided container 115.

The third compartment 82 is hingedly secured to the first compartment 10 utilizing fastener 151. A support arm 153 having a first portion 155 and second portion 157 provides support for the third compartment 82. The support arm 153 is constructed and provides the same functionality as the support arm 86 previously discussed herein.

Figure 4:
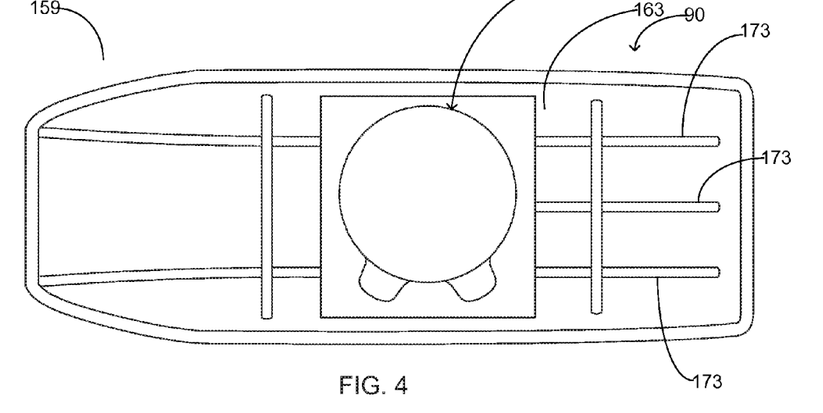
FIG. 4 is a top view of the sliding transport member of the present invention.

Illustrated in particular in FIG. 4 is the sliding transport member 90. The sliding transport member 90 is modified rectangular in shape having a tapered end 159. The sliding transport member 90 is manufactured from a rigid durable material such as but not limited to plastic. The sliding transport member 90 includes a recessed mold 161 integrally formed into the bottom 163. The recessed mold 161 is integrally formed into the bottom 163 and is operable to mateably receive the bottom 16 of the first compartment 10. The recessed mold 161 provides a secure technique of releasably securing the first compartment 10 to the sliding transport member 90. The sliding transport member 90 functions to allow a user to traverse across a terrain and tow the transportable storage device 100 in conditions such as but not limited to ice or if the transportable storage device 100 is too heavy for the user. The transportable storage device 100 includes a first rod 165 and a second rod 167 that are on opposing sides of the recessed mold 161 and extend laterally across the sliding transport member 90. The first rod 165 and second rod 167 are suspended intermediate walls 169, 171 such that there is a void intermediate the first rod 165, second rod 167 and the bottom 163. The void allows a user route a portion of a strap or similar device around the first rod 165 and second rod 167 and then secure to the first compartment 10 for additional securing of the first compartment 10 to the sliding transport member 90. Those skilled in the art will recognize that numerous types of fasteners and/or techniques could be utilized to secure the first compartment 10 to the sliding transport member 90. The sliding transport member 90 further includes a plurality of stringers 173. The stringers 173 are oriented in a longitudinal manner and extend the length of the sliding transport member 90. The stringers 173 function to provide additional structural support for the sliding transport member 90. It is contemplated within the scope of the present invention that the recessed mold 161 could be formed in any mateable shape so as to mate with any shape in which the first compartment 10 is manufactured.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A transportable storage device having multiple storage compartments wherein one compartment is configured to maintain a temperature dissimilar to that of its environment and wherein the transportable storage device is operable to be slidably traversed across a terrain comprising:

a first compartment, said first compartment being cylindrical in shape, said first compartment having a wall and a bottom forming an interior volume, said wall having an interior surface and an exterior surface, said first compartment including a first end and a second end, said first compartment having an opening proximate said first end, said first compartment further including outer threads proximate said first end, said wall further including an insulative layer, said first compartment further including a top, said top further including threads configured to be mateably secured to said outer threads, said top having superposed thereon a cushion, said cushion being releasably secured to said top, said first compartment configured with a second opening, said second opening being journaled through said wall, said second opening being generally square in shape, said second opening having an upper edge and a lower edge said first compartment further including four support brackets, said four support brackets having a first member and a second member, said four brackets mounted to said interior surface of said wall generally equidistant around the circumference of said interior volume;

a second compartment, said second compartment being annular in shape having a wall and a bottom forming an interior volume, said second compartment having upper end and a lower end, said second compartment being hingedly secured to said first compartment wherein a fastener is mounted proximate said lower end of said second compartment and proximate said first end of said first compartment, said second compartment having a first position and a second position, said second compartment being divided into five compartments wherein one of said five compartments is annular in shape and centrally located within said interior volume of said second compartment, said bottom of said second compartment being generally perpendicular with said wall of said first compartment in said second position, said bottom of said second compartment being adjacent said wall of said first compartment in said first position, said second compartment further including a top, said top having a first portion and a second portion, said first portion and said second portion operably coupled with a hinge, said first portion and said second portion being generally equal in size;

a third compartment, said third compartment being hingedly secured to said first compartment diametrically opposed to said second compartment, said third compartment being annular in shape, said third compartment having a bottom and a wall forming an interior volume, said third compartment having a first position and a second position, said bottom of said third compartment being generally perpendicular to said wall of said first compartment in said second position, said bottom of said third compartment being adjacent to and generally parallel with said wall upon said third compartment being in said first position, said third compartment further including a top, said top having a first section and a second section, said first section and said section being operably coupled with a hinge, said first section and said second section being generally equal in size;

a first support arm and a second support arm, said first support arm operably connected to said first compartment and said second compartment, said first support arm having a first portion and a second portion, said first portion and said second portion being pivotally mounted, said second support arm being operably connected to said first compartment diametrically opposed to said first support arm, said second support arm having a first portion and a second portion, said first portion and said second portion being pivotally mounted to each other, said second support arm operably connected to said first compartment and said third compartment;

a first container, said first container being annular in shape, said first container having a wall and bottom forming an interior volume, said wall being approximately twenty five percent of the height of said wall of said first compartment, said first container being superposed said four support brackets inside said first compartment; and a transport member, said transport member including a recessed mold, said recessed mold having a cavity of mateable size so as to receive said bottom of said first compartment, said recessed mold operable to mateably receive said first compartment, said sliding transport member further including lateral support rods, said lateral support rods being mounted on opposing sides of said recessed mold, said transport member configured to allow a user to slidably traverse the transportable storage device across a terrain.

2. The transportable storage device as recited in claim 1, and further including a first fishing rod butt holder and a second fishing rod butt holder, said first fishing rod butt holder and said second rod butt holder being integrally mounted to said exterior surface of said wall of said first compartment proximate said second end, said first fishing rod butt holder and said second fishing rod butt holder being adjacent to each other, said first fishing rod butt holder and said second fishing rod butt holder further including a depression to receive therein a portion of a fishing rod butt.

3. The transportable storage device as recited in claim 2, and further including a second container, said second container being rotatably mounted within said third compartment, said second container including a plurality of configurable walls creating a multitude of compartments operable to receive and store objects therein, said second container being semi-annular in shape.

4. The transportable storage device as recited in claim 3, and further including a locking member, said locking member operably coupled to said second container, said locking member operable to maintain said second container in a substantially fixed position.

5. The transportable storage device as recited in claim 4, and further including a first upper clip and a second upper clip, said first upper clip and said second upper clip being mounted to said exterior surface of said wall of said first compartment, said first upper clip and said second upper clip being generally axially aligned with said first rod butt holder and said second rod butt holder, said first upper clip and said second upper clip being proximate said first end of said first compartment.

6. The transportable storage device as recited in claim 5, and further including a pair of lower clips, said lower clips being mounted to said exterior surface of said wall of said first compartment, said lower clips operable to releasable secure an object therein.

\* \* \* \* \*